(12) United States Patent
Adachi

(10) Patent No.: US 7,376,343 B2
(45) Date of Patent: May 20, 2008

(54) DVD DRIVE INTEGRATED TELEVISION RECEIVER, DVD TELEVISION SYSTEM AND ZOOM MODE SETUP METHOD

(75) Inventor: Takafumi Adachi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 707 days.

(21) Appl. No.: 10/922,414

(22) Filed: Aug. 19, 2004

(65) Prior Publication Data

US 2005/0041961 A1    Feb. 24, 2005

(30) Foreign Application Priority Data

Aug. 19, 2003    (JP)    ............ P. 2003-295420

(51) Int. Cl.
*H04N 9/79*    (2006.01)
*H04N 5/00*    (2006.01)

(52) U.S. Cl. ........................ 386/125; 386/45

(58) Field of Classification Search ............ 386/45–46, 386/125–126

See application file for complete search history.

(56) References Cited

U.S. PATENT DOCUMENTS 5,815,631 A  *  9/1998  Sugiyama et al. ............ 386/46

6,523,696 B1  *  2/2003  Saito et al. .................. 709/223

FOREIGN PATENT DOCUMENTS

JP    8-336095    12/1996

OTHER PUBLICATIONS

Patent Abstracts of Japan, Publication No.: 08-336095, Publication Date: Dec. 17, 1996, 1 page.

* cited by examiner

*Primary Examiner*—Thai Q. Tran
*Assistant Examiner*—Nigar Chowdhury
(74) *Attorney, Agent, or Firm*—Osha Liang LLP

(57) ABSTRACT

A DVD drive integrated television receiver includes a first microcomputer for a television having a zooming function, and a second microcomputer for a DVD drive having a zooming function and connected to the first microcomputer to enable two-way communication. Preferably, with respect to a first zoom mode common to zoom modes for the television and the DVD drive, a zooming function is shared by employing preferentially the zoom mode for the television, information on a DVD drive zoom mode is obtained when an operation is switched to the television, the first microcomputer employs the information to set up a television zoom mode if the information is for the first zoom mode, and sets the television zoom mode to a zoom mode designated before the operation was switched to the DVD drive if the information is not for the first zoom mode.

4 Claims, 4 Drawing Sheets

DVD DRIVE INTEGRATED TELEVISION RECEIVER, DVD TELEVISION SYSTEM AND ZOOM MODE SETUP METHOD

BACKGROUND OF THE INVENTION

1. Field of the Invention

The present invention relates to a DVD drive integrated television receiver and a DVD television system wherefor, to enable two-way communication, a microcomputer for a television having a zoom function is connected to a microcomputer for a DVD drive that also has a zoom function. More particularly, the present invention relates to a DVD drive integrated television receiver for which the objective is the common use of a zooming function by a television and a DVD drive that have different zoom modes.

2. Description of the Related Art

Conventionally available is an interactive TV set, for which a television function and a personal computer function are combined, that has a function for zooming and displaying part of a broadcast picture (see, for example, JP-A-8-336095).

Similarly, there is a conventional DVD drive integrated digital television receiver wherein a DVD drive and a television receiver have individual zooming functions.

The television receiver has, for example, a zoom mode (zoom magnification) consisting of a zoom 1 (1.3 magnification), while the DVD drive has zoom modes (zoom magnifications) consisting of a zoom 1 (1.3 magnification), a zoom 2 (2.0 magnification) and a zoom 3 (4.0 magnification). That is, the television receiver and the DVD drive have different zooming functions.

SUMMARY OF THE INVENTION

In this case, the conventional DVD drive integrated television receiver neither reflects to the DVD drive the zoom setup performed by the television receiver, nor reflects to the television receiver the zoom setup performed by the DVD drive.

Therefore, when digital zooming is performed while the television receiver is operating, and when the current operation is switched to the operation for playing the DVD drive, the OSD (On Screen Display) and the sub-title provided by the DVD drive will not fit on the monitor screen. Further, in this state, when zooming is also performed by the DVD drive, since the zooming is performed both by the television receiver and the DVD drive, the zooming of a picture is greater than necessary, providing a lower resolution.

To resolve this problem, it is one objective of the present invention to provide a DVD drive integrated television receiver and a DVD television system for which the objective is a zoom setup, used in common by a television receiver and a DVD drive, so that improved operability is provided and the occurrence of the conventional problem is prevented.

To achieve this objective, according to this invention, provided is a DVD drive integrated television receiver including a first microcomputer for a television having a zooming function, and a second microcomputer for a DVD drive having a zooming function and connected to the first microcomputer to enable two-way communication. Preferably, with respect to a first zoom mode common to a zoom mode prepared for the television and a zoom mode prepared for the DVD drive, a zooming function is shared by employing preferentially the zoom mode prepared for the television. Preferably, when an operation is switched from the DVD drive to the television, the first microcomputer obtains information on a zoom mode at the DVD drive from the second microcomputer, in case that the information is for the first zoom mode, the first microcomputer employs the information to set up a zoom mode at the television, and in case that the information is not for the first zoom mode but is for a zoom mode unique to the DVD drive, the first microcomputer sets the zoom mode at the television to a zoom mode designated before the operation was switched from the television to the DVD drive.

For the invention having this feature, assume that the television zoom mode (zoom magnification) is zoom 1 (1.3 magnification), and that the DVD zoom modes (zoom magnifications) are zoom 1 (1.3 magnification), zoom 2 (2 magnification) and zoom 3 (4.0 magnification). In this state, when the operation is switched to the DVD drive, the television microcomputer employs the zooming function for the television to provide an OSD display using the zoom 1 that was provided by the DVD drive. Thereafter, when the DVD drive designates zoom 1 or zoom 3, the DVD microcomputer employs the zooming function of the DVD drive to provide the OSD display provided by zoom 2 or zoom 3. Whereas, when the zoom 2 is set for the DVD operation and the operation is switched to the television, the television microcomputer regards as invalid the zoom mode employed for the DVD operation, and sets the zoom function (e.g., zoom 1) that was designated before the operation was switched from the television to the DVD. That is, according to the invention, the zooming function, zoom 1, for the television is employed to perform zooming while the DVD is playing, so that the zoom 1 zooming function is used in common. Therefore, the usability of the zooming function can be improved.

Further, provided is a DVD and television system including a first microcomputer for a television having a zooming function, and a second microcomputer for a DVD drive having a zooming function and connected to the first microcomputer to enable two-way communication. Preferably, with respect to a first zoom mode common to a zoom mode prepared for the television and a zoom mode prepared for the DVD drive, a zooming function is shared by employing preferentially the zoom mode prepared for the television.

Specifically, when an operation is switched from the television to the DVD drive, the second microcomputer obtains information on a zoom mode at the television from the first microcomputer, and the second microcomputer employs the information to set up a zoom mode at the DVD drive. That is, when zoom 1 is designated by the television, zoom 1 is also set up and used by the DVD drive.

Furthermore, when an operation is switched from the DVD drive to the television, the first microcomputer obtains information on a zoom mode at the DVD drive from the second microcomputer, in case that the information is for the first zoom mode, the first microcomputer employs the information to set up a zoom mode at the television, and in case that the information is not for the first zoom mode but is for a zoom mode unique to the DVD drive, the first microcomputer regards the zoom mode at the DVD drive as invalid and turns off a zooming function. For example, when zoom 2 is setup for the DVD operation, and when in this state the operation is switched to the television, the microcomputer of the television regards as invalid the zoom mode used during the DVD operation and turns off the zooming function. That is, according to the invention, in zoom 1, the zooming function for the television is employed to perform zooming while the DVD is playing, so that the zooming function provided by zoom 1 is employed in common. Thus, the usability of the zooming function can be improved.

Further, provided is a zoom mode setup method for setting up a zoom mode using a first microcomputer for a television having a zooming function, and a second microcomputer for a DVD drive having a zooming function and connected to the first microcomputer to enable two-way communication. The zoom mode setup method includes sharing a zooming function by employing preferentially a zoom mode prepared for the television, with respect to a first zoom mode common to the zoom mode prepared for the television and a zoom mode prepared for the DVD drive, obtaining information on a zoom mode at the television from the first microcomputer when an operation is switched from the television to the DVD drive and employing the information to set up a zoom mode at the DVD drive, and obtaining information on the zoom mode at the DVD drive from the second microcomputer when the operation is switched from the DVD drive to the television, in case that the information is for the first zoom mode employing the information to set up the zoom mode at the television, and in case that the information is not for the first zoom mode but is for a zoom mode unique to the DVD drive regarding the zoom mode at the DVD drive as invalid and turning off a zooming function.

According to the DVD drive integrated television receiver and the DVD television system of the invention, since a zooming function is set up and employed in common by the television receiver and the DVD drive, the usability of the zooming function can be improved. Specifically, when digital zooming is being performed during the operation of the television receiver and the operation is switched to the operation for the playing of the DVD drive, it is possible to prevent the occurrence of a defect that prevents an OSD display or a sub-title provided by the DVD drive from fitting on the monitor screen. It is also possible to prevent the occurrence, during the operation of the television receiver and while digital zooming is being performed both by the television receiver and the DVD drive, of a defect that causes a picture to be zoomed more than necessary and lowers the resolution.

BRIEF DESCRIPTION OF THE DRAWINGS

Preferred embodiments of the present invention will be described in detail based on the following figures, wherein.

DETAILED DESCRIPTION OF THE INVENTION

The preferred embodiment of the present invention will now be described while referring to the accompanying drawings.

Figure 1:
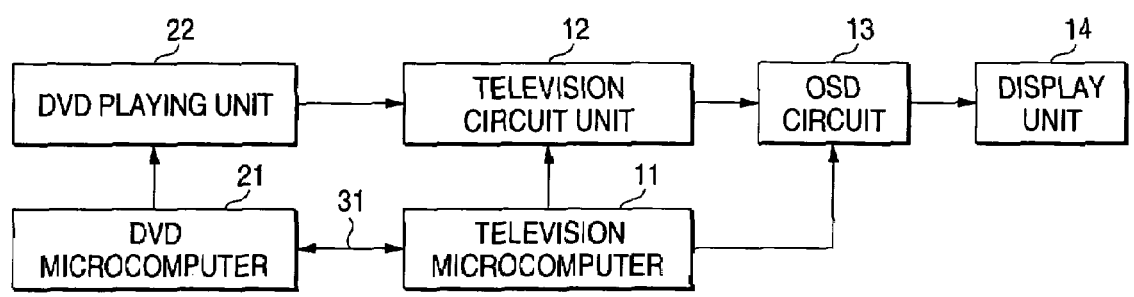
FIG. 1 is a block line diagram showing the electric configuration for a DVD drive integrated television receiver according to the present invention.

FIG. 1 is a diagram showing the system configuration of a DVD television system according to the present invention. For this embodiment, a DVD drive integrated television receiver is employed as an example.

In the DVD drive integrated television receiver of this embodiment, a television microcomputer 11 and a DVD microcomputer 21 are connected, by a bus 31, to enable two-way communication. A DVD playing unit 22 is controlled by the DVD microcomputer 21, and a television circuit unit 12, which includes a tuner and a demodulator, and an OSD circuit 13 are controlled by the television microcomputer 11.

The DVD playing unit 22 is a block that plays a DVD in accordance with an instruction received from the DVD microcomputer 21 and transmits reproduced picture signals and audio signals to the television circuit unit 12. The DVD playing unit 22 also has a zooming function related to this invention.

The television circuit unit 12 is a block for receiving a commercial broadcast and displaying it on a display unit 14 and also has a zooming function related to this invention. Furthermore, the television circuit unit 12 transmits the picture signals and the audio signals received from the DVD playing unit 22 to the OSD circuit 13 for display on the display unit 14.

The television microcomputer 11 and the DVD microcomputer 21 exchange zoom data along the bus 31, and interact with each other to exercise zooming control.

In this embodiment, zoom 1 (1.3 magnification) is provided as the zoom mode (zoom magnification) for the television, and zoom 1 (1.3 magnification), zoom 2 (2.0 magnification) and zoom 3 (4.0 magnification) are provided as the zoom modes (zoom magnifications) for the DVD drive.

In this case, zoom 1 is used in common by the television and the DVD drive. However, the OSD display in zoom 1 must be standardized for the television and the DVD drive. That is, when the size of the OSD display differs for the zoom provided by the television and the zoom provided by the DVD drive, the appearance of the picture on the screen differs, even though the identical zoom magnification is employed. Therefore, the size of the display using zoom 1 must be standardized.

As for the operation of the zooming function of the thus arranged DVD drive integrated television receiver, an explanation will be given for (1) the zoom operation performed when the operation is switched from the television to the DVD drive, (2) the zoom changing operation performed during the playing of a DVD, and (3) the zoom operation performed when the operation is switched from the DVD drive to the television.

Figure 2:
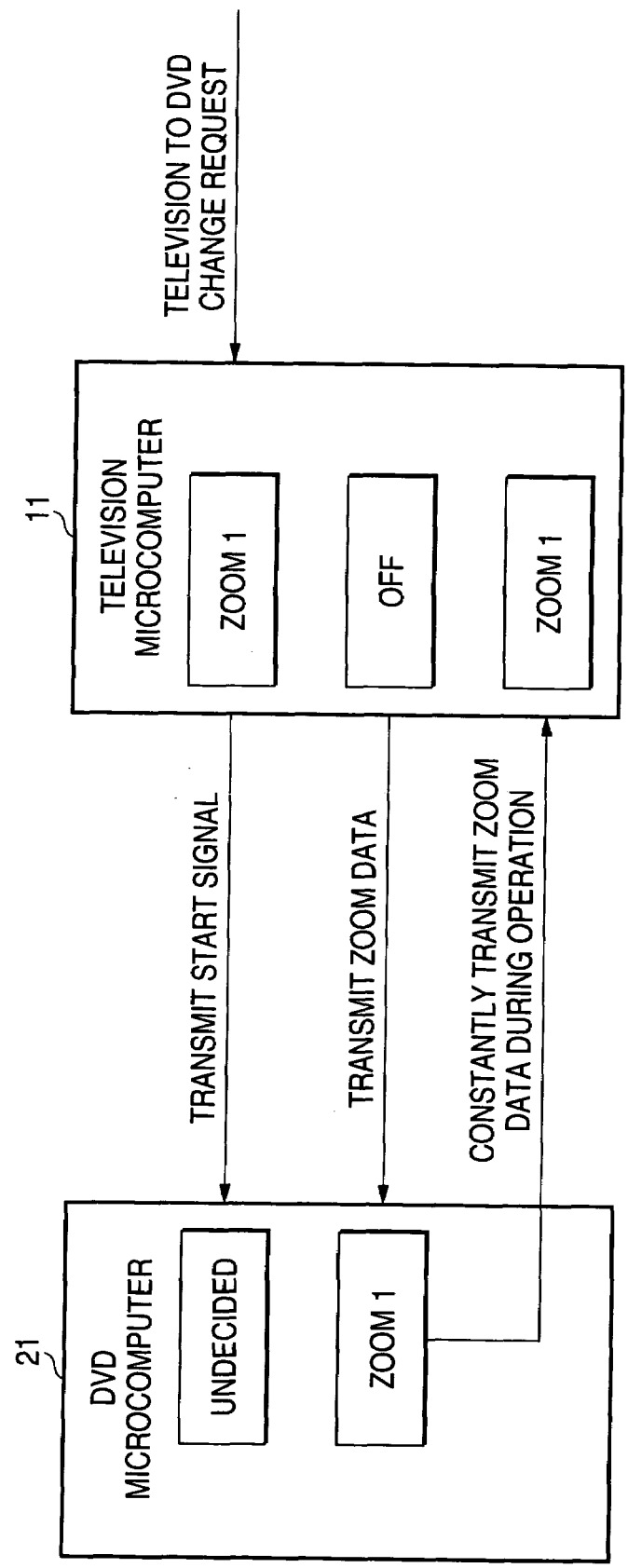
FIG. 2 is a diagram for explaining the zooming operation performed when operation is switched from a television to a DVD drive.

(1) The zoom operation performed when the operation is switched from the television to the DVD drive will now be described while referring to FIG. 2.

When the television microcomputer 11 receives a request from an external remote controller (not shown) to switch to the DVD drive, the television microcomputer 11 transmits a start signal to the DVD microcomputer 21 to activate the DVD drive. The television microcomputer 11 also transmits, to the DVD microcomputer 21, zoom data for the television that was employed before the operation was switched from the television to the DVD drive. The DVD microcomputer 21 employs the received zoom data as the zoom data that is to be used for playing a DVD. That is, when the received data indicates that the mode for the television is a zoom-off mode, the DVD drive performs the playing operation in a zoom-off mode. And when the mode indicated by the received data is zoom 1, the DVD drive employs zoom 1 for the playing operation.

Figure 3:
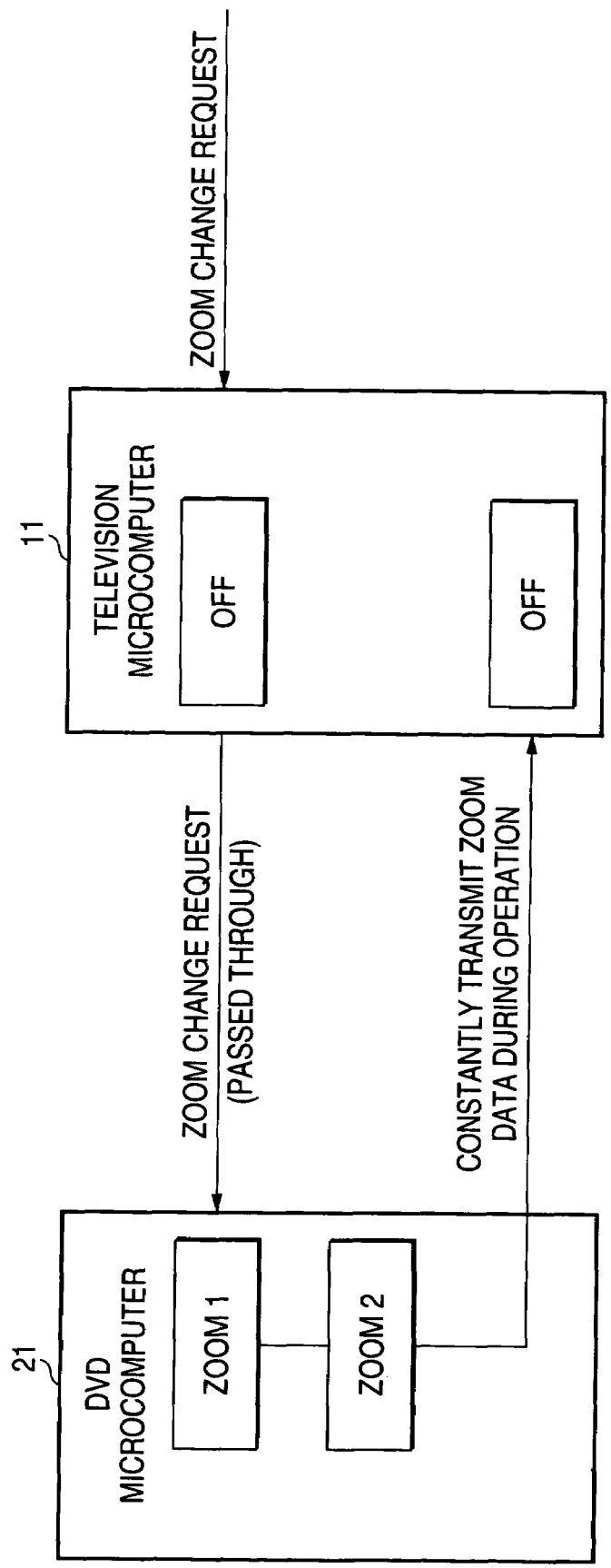
FIG. 3 is a diagram for explaining the zoom changing operation performed during the playing of a DVD.

(2) The zoom changing operation performed during the playing of a DVD will now be described while referring to FIG. 3.

After being activated, the DVD microcomputer 21 always transmits zoom data for the DVD drive to the television microcomputer 11, while the television microcomputer 11 constantly monitors the zooming mode of the DVD drive. In this state, when the television microcomputer 11 receives a zoom change request from the external remote controller (not shown), the television microcomputer 11 determines whether switching to the zoom setup designated in the zoom change request is possible. When the zoom setup can be switched, the television microcomputer 11 transmits the zoom change request to the DVD microcomputer 21.

During the processing performed to "determine whether switching the zoom setup is possible" the state of the DVD is examined, because basically, zooming functions are available only when a DVD is being played, and are invalid when an OSD display, such as a menu screen, is provided.

When the zoom setup is switched and the new zoom setup is for a zoom-off or a zoom 1 mode, the television microcomputer 11 provides an OSD display consonant with the zoom mode. That is, when the zoom-off or the zoom 1 mode is set, the DVD drive does not provide an OSD display. When, however, the new zoom setup is for a zoom 2 or a zoom 3 mode, the DVD drive provides an OSD display consonant with this zoom mode, and the television does not provide an OSD display.

As is described above, according to the invention, in the zoom-off or the zoom 1 mode, the zooming function of the television is employed to perform zooming while a DVD is being played, so that in the zoom 1 mode the zooming function is used in common. As a result, the usability of the zooming function can be improved.

Figure 4:
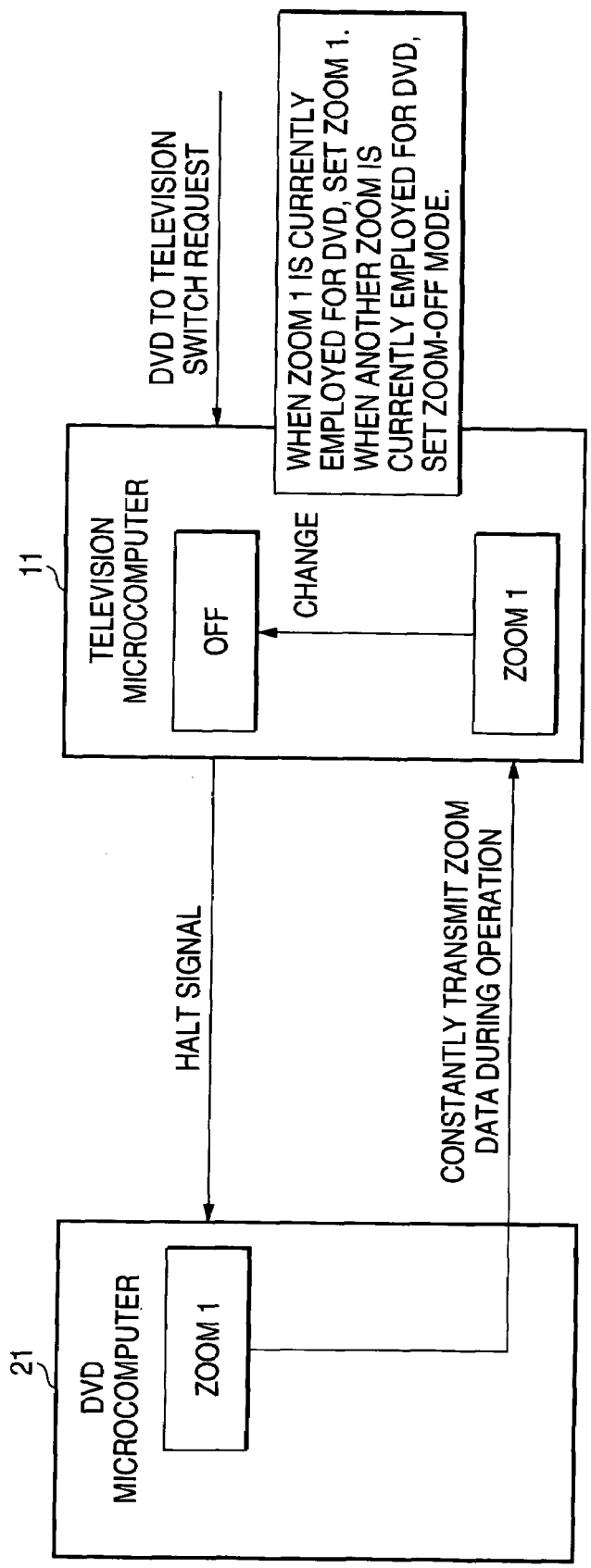
FIG. 4 is a diagram for explaining the zooming operation performed when the operation is switched from the DVD drive to the television.

(3) The zooming operation performed when the operation is switched from the DVD drive to the television will now be described while referring to FIG. 4.

When the television microcomputer 11 receives a request from the external remote controller (not shown) to switch from the DVD drive to the television, the television microcomputer 11 transmits a halt signal to the DVD microcomputer 21 to stop the DVD drive. At this time, the television microcomputer 11 employs the zoom data used for the DVD drive before the DVD drive was halted, because the television microcomputer 11 constantly monitors the zoom state of the DVD drive.

That is, when the television microcomputer 11 employs the zoom data used for the DVD drive before the DVD drive was halted, the television microcomputer 11 sets the zoom-off or the zoom 1 mode for the television.

On the other hand, when the zoom data for the DVD drive before the DVD drive was halted was for the zoom 2 or the zoom 3 mode, the television microcomputer 11 regards as invalid the zoom mode designated during the DVD operation, and sets the zoom-off mode. When the zoom data for the DVD drive before the DVD drive was halted was for the zoom 2 or the zoom 3 mode, the television microcomputer 11 regards as invalid the zoom mode designated during the DVD operation, and may set a zoom mode (e.g., zoom 1) that was designated before the operation was switched from the television to the DVD drive.

In this embodiment, the present invention is applied for the DVD drive integrated television receiver. However, a DVD drive and a television may be separately provided. In this case, instead of the bus 31 in FIG. 1, a two-way communication line that conforms, for example, to the serial interface standards for IEEE 1394 need only be employed to connect the television microcomputer 11 and the DVD microcomputer 21. Thus, the present invention can be provided as a DVD television system that enables the microcomputer 21 of the DVD drive and the microcomputer 11 of the television receiver to perform two-way communication.

In addition, the display unit 14 is not limited to a television-type display apparatus, which includes CRT (Cathode-Ray Tube), LCD (Liquid Crystal Display), PDP (Plasma Display Panel), and the like, but a projection type display apparatus may be employed as the display unit.

What is claimed is:

1. A DVD drive integrated television receiver comprising:
a first microcomputer for a television having a zooming function; and
a second microcomputer for a DVD drive having a zooming function and connected to the first microcomputer to enable two-way communication,
wherein
with respect to a first zoom mode common to a zoom mode prepared for the television and a zoom mode prepared for the DVD drive, a zooming function is shared by employing preferentially the zoom mode prepared for the television,
and wherein
when an operation is switched from the DVD drive to the television, the first microcomputer obtains information on a zoom mode at the DVD drive from the second microcomputer,
in case that the information is for the first zoom mode, the first microcomputer employs the information to set up a zoom mode at the television, and
in case that the information is not for the first zoom mode but is for a zoom mode unique to the DVD drive, the first microcomputer sets the zoom mode at the television to a zoom mode designated before the operation was switched from the television to the DVD drive.

2. A DVD and television system comprising:
a first microcomputer for a television having a zooming function; and
a second microcomputer for a DVD drive having a zooming function and connected to the first microcomputer to enable two-way communication,
wherein with respect to a first zoom mode common to a zoom mode prepared for the television and a zoom mode prepared for the DVD drive, a zooming function is
shared by employing preferentially the zoom mode prepared for the television,
wherein when an operation is switched from the television to the DVD drive, the second microcomputer obtains information on a zoom mode at the television from the first microcomputer, and
wherein the second microcomputer employs the information to set up a zoom mode at the DVD drive.

3. A DVD and television system comprising:
a first microcomputer for a television having a zooming function; and
a second microcomputer for a DVD drive having a zooming function and connected to the first microcomputer to enable two-way communication,
wherein with respect to a first zoom mode common to a zoom mode prepared for the television and a zoom mode prepared for the DVD drive, a zooming function is shared by employing preferentially the zoom mode prepared for the television, and, wherein when an operation is switched from the DVD drive to the television, the first microcomputer obtains information on a zoom mode at the DVD drive from the second microcomputer, in case that the information is for the first zoom mode, the first microcomputer employs the information to set up a zoom mode at the television, and in case that the information is not for the first zoom mode but is for a zoom mode unique to the DVD drive, the first microcomputer regards the zoom mode at the DVD drive as invalid and turns off a zooming function.

4. A zoom mode setup method for setting up a zoom mode using a first microcomputer for a television having a zooming function, and a second microcomputer for a DVD drive having a zooming function and connected to the first microcomputer to enable two-way communication, the zoom mode setup method comprising:

sharing a zooming function by employing preferentially a zoom mode prepared for the television, with respect to a first zoom mode common to the zoom mode prepared for the television and a zoom mode prepared for the DVD drive, obtaining information on a zoom mode at the television from the first microcomputer when an operation is switched from the television to the DVD drive, and employing the information to set up a zoom mode at the DVD drive, and obtaining information on the zoom mode at the DVD drive from the second microcomputer when the operation is switched from the DVD drive to the television, in case that the information is for the first zoom mode, employing the information to setup the zoom mode at the television, and in case that the information is not for the first zoom mode but is for a zoom mode unique to the DVD drive, regarding the zoom mode at the DVD drive as invalid and turning off a zooming function.

* * * * *